United States Patent [19]
Graf

[11] Patent Number: 5,396,420
[45] Date of Patent: Mar. 7, 1995

[54] CONTROL UNIT FOR AUTOMATIC TRANSMISSIONS IN MOTOR VEHICLES

[75] Inventor: Friedrich Graf, Regensburg, Germany

[73] Assignee: Siemens Aktiengesellschaft, Munich, Germany

[21] Appl. No.: 884,493

[22] Filed: May 15, 1992

[30] Foreign Application Priority Data

May 17, 1991 [EP] European Pat. Off. ......... 91108043

[51] Int. Cl.⁶ .................................. G06F 15/20
[52] U.S. Cl. .................. 364/424.1; 364/424.05; 477/128
[58] Field of Search ............. 364/424.1, 424.05; 74/866

[56] References Cited

U.S. PATENT DOCUMENTS

| | | | |
|---|---|---|---|
| 4,490,790 | 12/1984 | Shiuoda | 364/424.1 |
| 4,679,145 | 7/1987 | Beeck et al. | 364/424.1 |
| 4,821,606 | 4/1989 | Leiber | 74/866 |
| 4,897,790 | 1/1990 | Bieber | 364/424.1 |
| 5,084,821 | 1/1992 | Ohsuga et al. | 364/424.05 |
| 5,247,859 | 9/1993 | Agusa et al. | 74/866 |

FOREIGN PATENT DOCUMENTS

| | | |
|---|---|---|
| 3318410 | 11/1984 | Germany. |
| 3144845 | 7/1987 | Germany. |
| 3341652 | 12/1987 | Germany. |
| 3933295 | 4/1990 | Germany. |
| 63-162344 | 7/1988 | Japan. |

Primary Examiner—Kevin J. Teska
Assistant Examiner—Susan Wieland
Attorney, Agent, or Firm—Herbert L. Lerner; Laurence A. Greenberg

[57] ABSTRACT

In a control unit for automatic transmissions of motor vehicles, shifting points of a transmission are determined from performance graphs. Through the use of an evaluation circuit, a driving style of a driver is recorded and taken into account in determining the shifting points of the transmission. An operating mode can be initiated by the driver, and during the operating mode, shifting points that are manually selected by the driver are stored permanently in memory for calling up the shifting points as desired.

6 Claims, 4 Drawing Sheets

CONTROL UNIT FOR AUTOMATIC TRANSMISSIONS IN MOTOR VEHICLES

The invention relates to a control unit for automatic transmissions of motor vehicles, with which shifting points of the transmission are determined from performance graphs and which is provided with an evaluation circuit through which the driving style of a driver is recorded and taken into account in determining the shifting points of the transmission.

Control units for automatic transmissions are typically constructed for at least two different shifting characteristic curves or modes, which might be called "sporty" and "fuel-saving", and which are each defined in a performance graph, for example. Switching between the two modes is performed manually or automatically (as in German Patent DE 33 41 652 C2 corresponding to U.S. Pat. No. 4,679,145 and in German Patent DE 31 44 845 C2 corresponding to U.S. Pat. No. 4,490,790). However, it has been found that often, the fixed, defined operating modes are not entirely what the driver wants, and even automatically switching between the two does not entirely suit his driving style. In that case, the driver tends to intervene manually into the shifting processes.

It is accordingly an object of the invention to provide a control unit for automatic transmissions in motor vehicles, which overcomes the hereinafore-mentioned disadvantages of the heretofore-known devices of this general type and in which the shifting style can be adapted precisely to the driving habits and wishes of the driver.

With the foregoing and other objects in view there is provided, in accordance with the invention, a control unit for automatic transmissions of motor vehicles, comprising means for determining shifting points of a transmission from performance graphs, an evaluation circuit for recording a driving style of a driver to be taken into account in determining the shifting points of the transmission, means for initiating an operating mode by the driver, and means for permanently storing shifting points manually selected by the driver in memory during the operating mode for calling up the shifting points as desired.

In accordance with an other feature of the invention, there is provided an additional characteristic curve memory for storing the manually selected shifting points.

In accordance with a further feature of the invention, there are provided means for specifying lower and upper limit values, and means for storing the manually selected shifting points in memory only if they are within the limit values.

In other words they are not stored in memory if they are below or above the limit values.

In accordance with a concomitant feature of the invention, there is provided a load recognition circuit for preventing storage in memory of the shifting points manually selected by the driver, under certain load conditions.

The invention makes the transmission control system "smart". Upon a command by the driver, the shifting points, which correspond to the driver's habitual way of driving, are stored in a special shifting performance graph or the like, and can then be called up as desired. In other words, a shifting characteristic curve that precisely matches the driver's way of driving is made available to the driver. With respect to storage in memory, provisions are also made to ignore any impermissible shifting points, such as for shifting into reverse at overly high rpm.

Other features which are considered as characteristic for the invention are set forth in the appended claims.

Although the invention is illustrated and described herein as embodied in a control unit for automatic transmissions in motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
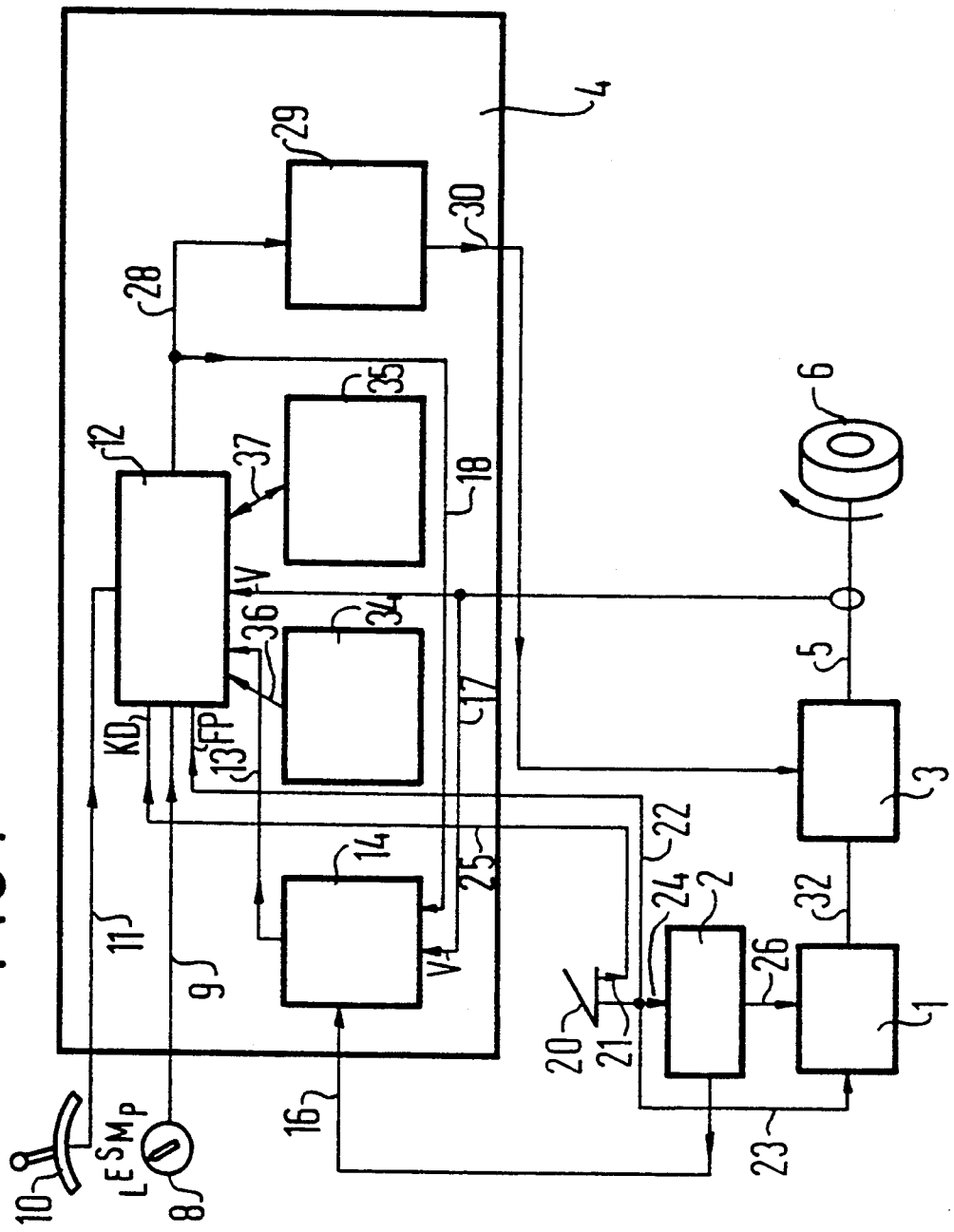
FIG. 1 is a schematic, diagrammatic and block circuit diagram of a motor vehicle power train provided with a control unit according to the invention.

Referring now to the figures of the drawing in detail and first, particularly, to FIG. 1 thereof, there is seen a power train of a motor vehicle which substantially includes an engine 1, engine control means 2, a transmission 3 and transmission control means 4. A drive torque output at an output shaft 5 of the transmission 3 is transmitted to wheels 6 of the motor vehicle. In FIG. 1, which is highly simplified, intervening elements such as a cardan shaft, a differential and axle shafts, are not shown. A shifting characteristic curve of the transmission control means 4 can be influenced by the driver through a selection switch 8, which has the following positions: E="economy", which is a fuel-saving mode; S=a sporty mode; P=an adaptive shifting mode; M=manual gear shifting, and L=learning. In the position M, the transmission is not shifted automatically by the transmission control means 4, but instead manually by the driver, through a manual gear selection switch 10.

Information on the position of the gear selection switch 8 that was selected by the driver, or in other words on the desired operating mode, and optionally information on the gear selected by the driver at the manual gear shift 10, travels over respective lines 9 and 11 to reach an evaluation circuit, in the form of a shifting point determination and gear calculation unit 12, for instance a program-controlled computer. The unit 12 is also connected over a line 13 with a load recognition circuit 14, which furnishes it with information on some particular load situation, such as driving uphill.

The load recognition circuit 14 has three inputs, at which it receives the following information: a variable that characterizes engine output, for instance the torque produced and the engine rpm which is supplied over a line 16 from the engine control means 2; the speed v, or the rpm proportional to it, of the transmission drive shaft 5 which is supplied over a line 17; and the gear being engaged at a given time which is supplied over a line 18.

An accelerator pedal 20 has a kick-down switch 21. The pedal is connected to the unit 12 over a line 22 and to the engine 1 as well as the engine control means 2 over respective lines 23 and 24. Actuation of the kick-down switch 21 is reported to the unit 12 over a line 25. The control signals of the engine control means 2 reach the engine 1 over a line 26.

The gear that is determined in the unit 12 on the basis of the information received is reported over a line 28 to actuator control means 29, which in turn forward corresponding actuator signals over a line 30 to the transmission 3. Final control elements or actuators in the transmission 3 are controlled with the actuator signals. These include hydraulic valves, for instance, with which clutches and brakes in the transmission are actuated, in order to shift the gear that is determined. The transmission 3 also receives information on the engine rpm at a given time, over a line 32.

The shifting points, at which a shift from one gear to another is made, are determined by the unit 12 with the aid of shifting characteristic curves, which are stored in a first shifting characteristic curve memory 34 and a second shifting characteristic curve memory 35. The memory 34 contains the memory of fixedly defined shifting characteristic curves, while in memory 35 shifting characteristic curve data that have adapted or "learned" according to the invention are stored. The data in the memory 34 are called up by the unit 12 over a line 36, while in contrast the unit 12 writes shifting point data into the memory 35 over a line 37 and reads them out again later as needed.

Figure 2:
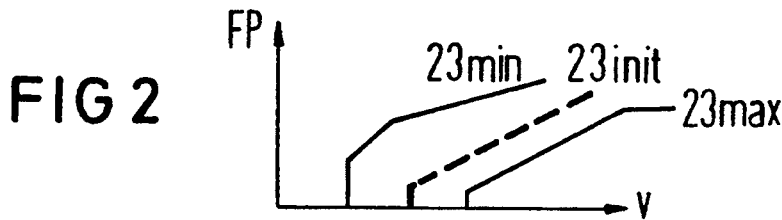
FIGS. 2–4 are various performance graphs serving to explain the invention.

Shifting characteristic curves are graphically shown in the diagram of FIG. 2, in which the vehicle speed v is plotted on the abscissa and the accelerator pedal position FP is plotted on the ordinate. A shifting line 23init, shown in dashed lines, makes shifting points available if the memory 35 is called up for the first time, or in other words before any driver-modified shifting curves have been stored in memory. The line 23init may, for instance, be an S shifting curve, or in other words a shifting curve for sporty driving, which is stored in the memory 34, specifically for upshifting from second gear to third gear.

If the driver selects the L operating mode, in which the shifting operations carried out manually are "learned", then the learning proceeds as described below. However, impermissible shifting, in particular into reverse, is precluded automatically in the L mode, in order to avoid racing of the engine, for instance. The allowable shifting point range for upshifting from second to third gear is limited by two characteristic curves 23min and 23max.

Figure 3:
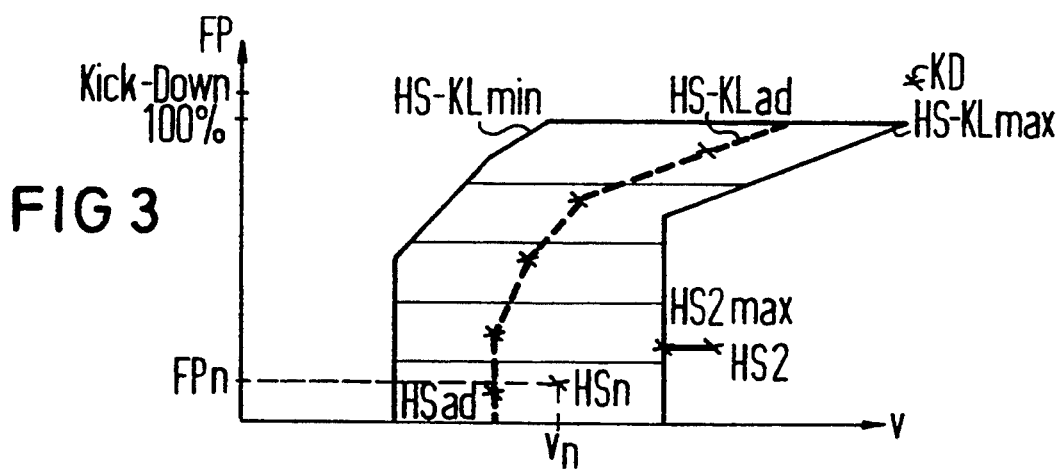

The calculation of driver-modified shifting points will be explained below with reference to FIG. 3:

The demarcation characteristics for upshifting are represented in this case by symbols HS-KLmin and HS-KLmax. The space between these two characteristic curves is divided into segments that are located vertically one above the other and are represented in the drawing by horizontal lines, with one modifiable shifting basis being associated with each segment. This makes it possible to limit the number of basis points necessary to define a shifting characteristic curve. The segments need not be of equal size. Smaller segments and a resultant greater basis point density may be located in regions in which shifting takes place more often.

If the driver, in the L mode, initiates upshifting, then a new shifting point HSn is involved, having the coordinates $v_n$, FPn. The existing, already learned or adapted shifting characteristic curve is referred to as HS-KLad. If the new shifting point HSn is farther away than a given distance from HS-KL ad, then its coordinates are calculated as follows:

$$FPad,new = FPad,old + (FPn - FPad,old)/k$$

$$Vad,new = Vad,old + (v_n - vad,old)/k$$

where $k > 1$.

This calculation has a filtering effect, where k has the function of a time constant. Before this newly adapted pair of values is stored in memory as HSad,new, a check is also made from the demarcation characteristic curves, as to whether or not a range has been exceeded. If so, then the value for the abscissa v is taken from the demarcation characteristic curve: HS2 max.

In the following cases, the newly calculated values are not stored in memory:

If shifting is performed while driving uphill or in general under varying load conditions, then the shifting points dictated by the driver are ignored. The driver's shifting behavior in that case is of limited duration and is sharply changed. If it were not ignored, the result would be an undesirable change in the already memorized shifting curves. This load state is recognized by the load recognition circuit 14, which outputs a signal to the unit 12 over the line 13 as applicable, to suppress storage in memory.

A kick-down switching point KD is a fixed point and cannot be shifted.

Suitably, a certain minimum distance from the next effective upshifting curve is specified. In the case of the shifting curve 2–3, this is the distance from the shifting curve 3–4 in order to obtain a generally balanced shifting performance of the transmission. Checking and correction are performed analogously to the description for the demarcation characteristic curves HS-Kmax. In other words, if the new shifting point is too close to the shifting characteristic curve above it, then a shifting point at the minimum distance away is stored in memory.

Figure 4:
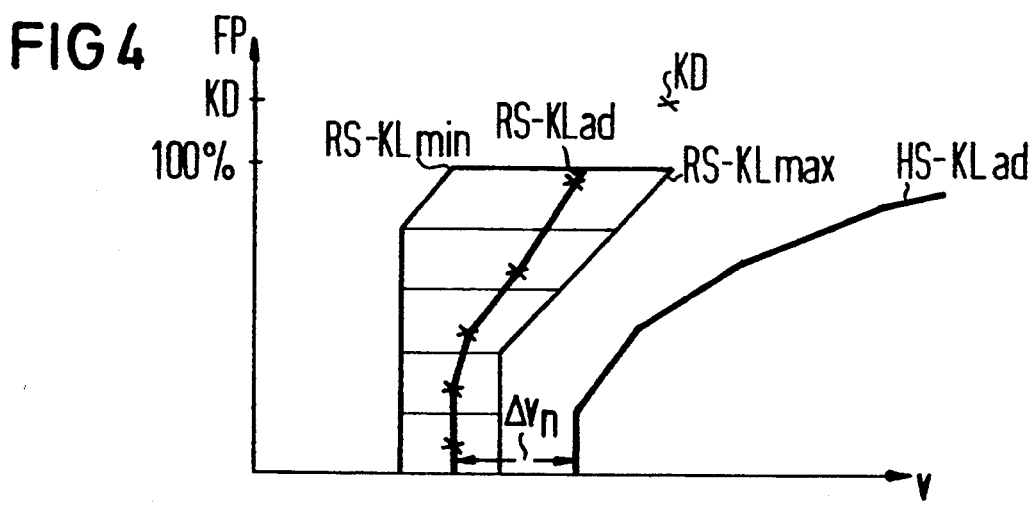

The storage in memory of shifting points for shifting into reverse will be described below in conjunction with FIG. 4. A reverse shifting characteristic curve RS-KLad that is adapted to the driver is defined by determining a predetermined number of basis points, as described in conjunction with FIG. 3 for the upshifting characteristic curves, and storing them in memory. However, provision for a shifting hysteresis must additionally be made by observing a predetermined minimum distance $\Delta v_n$ from the adapted upshifting characteristic curve HS-KLad. This hysteresis prevents hectic upshifting, or shifting into reverse, when only small changes are occurring in the driving situation. The minimum spacing $\Delta v_n$ must be observed between the corresponding upshifting and reverse shifting characteristic curves, for instance between the reverse shifting characteristic curve RS-KLad and the upshifting characteristic curve HS-KLad. Minimum distances must thus be observed both among the various upshifting characteristic curves and the various reverse shifting characteristic curves, and between each reverse shifting characteristic curve and the corresponding upshifting curve.

The shifting characteristic curves that are determined and stored in the memory 35 of FIG. 1 as described above are then available to the driver as his own shifting program, which he can activate at any time through a switch or through an additional position of the selector switch 8. The transmission 3 then provides control at shifting points that precisely match the driving style of the driver. However, in this driving program as well, under certain load conditions, such as driving in the mountains, shifting is done automatically, as already explained, in accordance with shifting characteristic curves that are uninfluenced by the driver.

Figure 5:
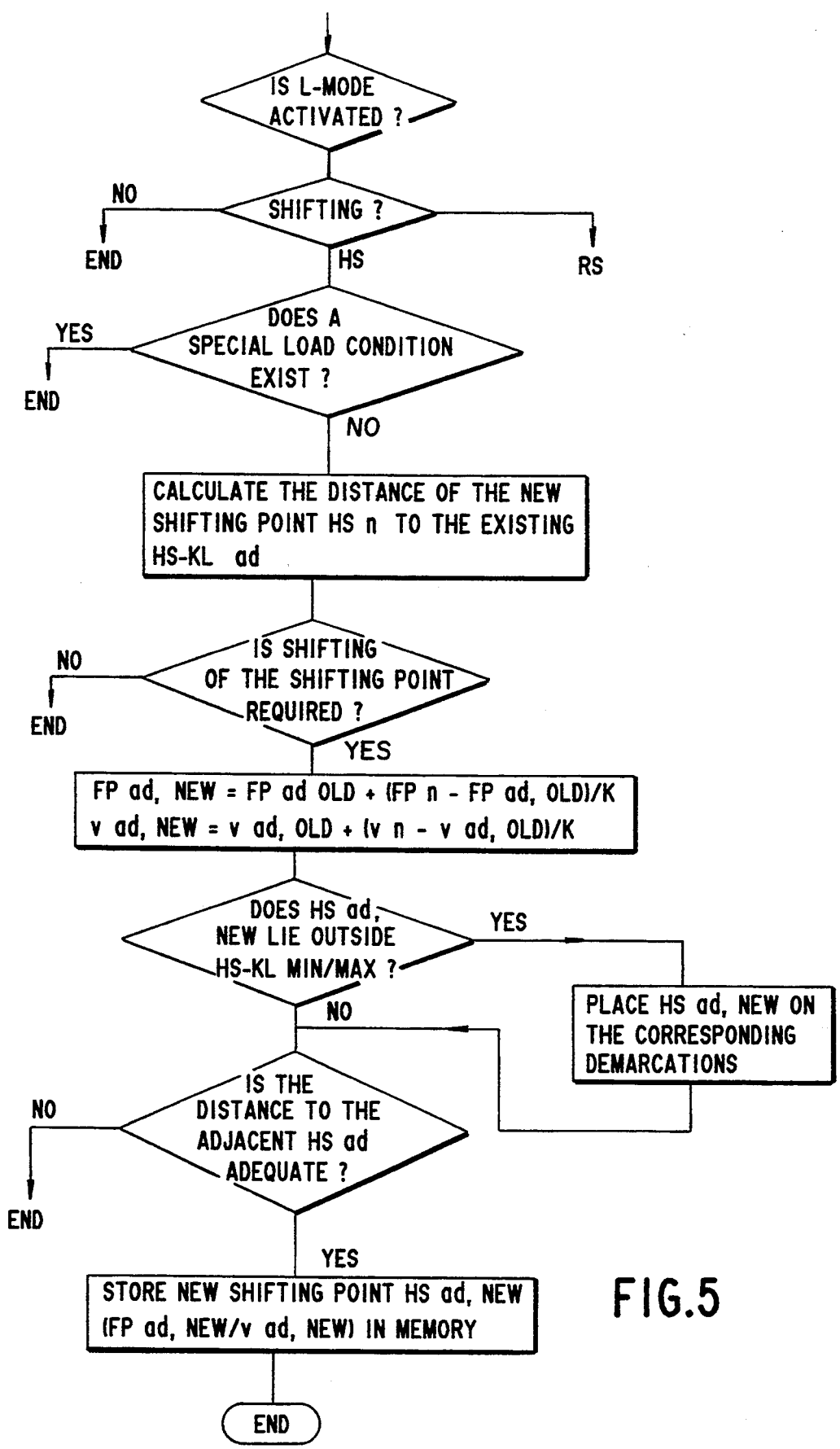
FIG. 5 is a flow chart from which the function of the control unit of FIG. 1 upon storage of upshifting into memory can be seen.
Figure 6:
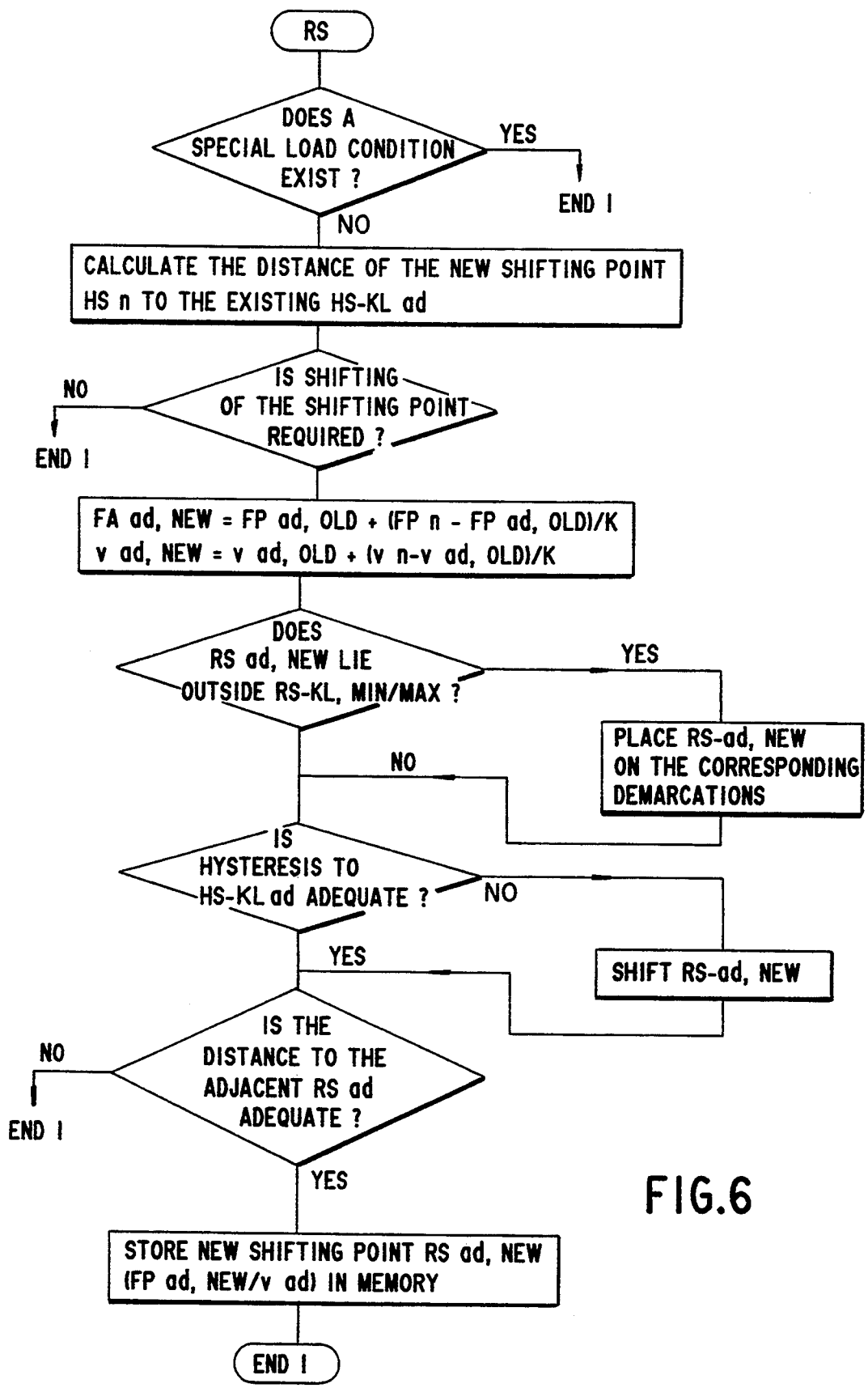
FIG. 6 is a corresponding flow chart for storing a shift into reverse into memory.

The mode of operation of the transmission control means 4 in the L mode for upshifting is illustrated in detail in FIG. 5 with a flow chart. FIG. 6 illustrates its mode of operation for shifting into reverse, again in terms of a flow chart.

I claim:

1. A control unit for automatic transmissions of motor vehicles, comprising means for determining shifting points of a transmission from performance graphs, an evaluation circuit for recording a driving style of a driver to be taken into account in determining the shifting points of the transmission, means for allowing a driver to initiate an operating mode during which the driver manually selects the shifting points, and means for permanently storing shifting points manually selected by the driver in memory during the operating mode for calling up the shifting points as desired.

2. The control unit according to claim 1, including an additional characteristic curve memory for storing the manually selected shifting points.

3. The control unit according to claim 1, including means for specifying lower and upper limit values, and means for storing the manually selected shifting points in memory if they are within the limit values.

4. The control unit according to claim 1, including means for specifying lower and upper limit values, and means for storing the manually selected shifting points in memory only if they are within the limit values.

5. The control unit according to claim 1, including a load recognition circuit for preventing storage in memory of the shifting points manually selected by the driver, under certain load conditions.

6. The control unit according to claim 1, including means associated with the transmission for switching to a manual shifting mode in which the shifting points between gears of the transmission are selected by the driver with a manual gear shifter.

* * * * *